COMPUTER MULTI-REGISTER LINKAGE WITH A MEMORY UNIT

Filed Dec. 3, 1962 6 Sheets-Sheet 1

INVENTOR
ROBERT V. BOCK
BY
Christie, Parker & Hale
ATTORNEYS

COMPUTER MULTI-REGISTER LINKAGE WITH A MEMORY UNIT

Filed Dec. 3, 1962 6 Sheets-Sheet 2

INVENTOR.
ROBERT V. BOCK
BY
Christie, Parker & Hale
ATTORNEYS.

INVENTOR.
ROBERT V. BOCK
BY
Christie, Parker & Hale
ATTORNEYS

INVENTOR
ROBERT V. BOCK
BY
Christie, Parker & Hale
ATTORNEYS

| | E REG.-28 STATES | | | | MEMORY UNIT-14 OPERATION |
|---|---|---|---|---|---|
| | E8FF | E4FF | E2FF | E1FF | |
| 0 | F | F | F | F | -- NO ACESS IN PROGRESS |
| 1 | F | F | F | T | ———— |
| 2 | F | F | T | F | -- (S) → A (READ) |
| 3 | F | F | T | T | -- (S) → B |
| 4 | F | T | F | F | -- (M) → A |
| 5 | F | T | F | T | -- (M) → B |
| 6 | F | T | T | F | -- (M) → M |
| 7 | F | T | T | T | ———— |
| 8 | T | F | F | F | ———— |
| 9 | T | F | F | T | ———— |
| 10 | T | F | T | F | -- A → (S) (WRITE) |
| 11 | T | F | T | T | -- B → (S) |
| 12 | T | T | F | F | -- A → (M) |
| 13 | T | T | F | T | -- B → (M) |
| 14 | T | T | T | F | ———— |
| 15 | T | T | T | T | ———— |
FIG. 5
FIG. 6
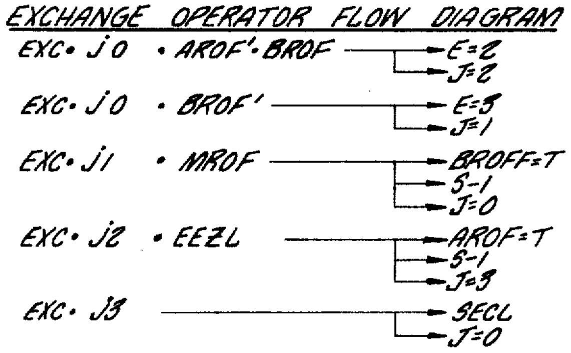
FIG. 6A
EXCHANGE SYLLABLE STRUCTURE
EXC: —
FIG. 7A
TRANSFER WORDS SYLLABLE STRUCTURE
TWD: RF
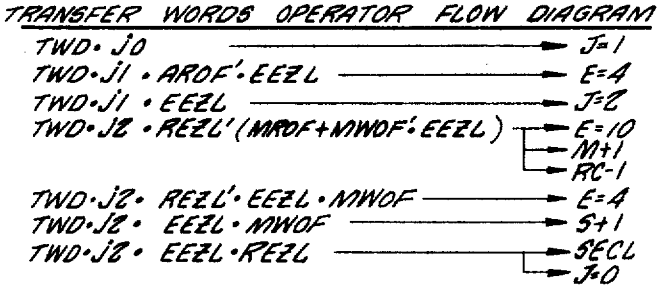
FIG. 7
INVENTOR
ROBERT V. BOCK
BY
Christie, Parker & Hale
ATTORNEYS

COMPUTER MULTI-REGISTER LINKAGE WITH A MEMORY UNIT

INVENTOR.
ROBERT V. BOCK
BY
Christie, Parker & Hale
ATTORNEYS.

United States Patent Office 3,268,874 Patented August 23, 1966

3,268,874
COMPUTER MULTI-REGISTER LINKAGE WITH A MEMORY UNIT

Robert V. Bock, Sierra Madre, Calif., assignor to Burroughs Corporation, Detroit, Mich., a corporation of Michigan Filed Dec. 3, 1962, Ser. No. 242,002
11 Claims. (Cl. 340—172.5)

This invention relates to digital computers and more particularly to a linkage system for coupling a digital computer and a memory unit together.

Digital computers are well known which have a distribution register for communications with a memory unit. Signals read out of the memory unit for storage in a particular register are stored in the distribution register and subsequently transferred to the particular register. Signals contained in a particular register of the digital computer which are to be written in the memory unit are transferred from the particular register into the distribution register and subsequently written in the memory unit. A specific example of such an arrangement is a digital computer having an accumulator register in which all signals to be written in the memory unit are stored whether they be signals resulting from a computation of the digital computer or signals transferred from other computer registers. Also, the above-mentioned prior art computers generally have a single address register associated with the distribution register for storing the address for use in addressing the memory unit for reading and writing the signals in the memory unit stored in the distribution register.

A disadvantage of the above-mentioned prior art system is that time is required in addition to the time required for computing operations of the digital computer for transferring signals to the distributor register and for shifting the desired address into the single address register associated with the distribution register.

Another disadvantage of the above-mentioned prior art digital computer arrangement is that the distribution register is generally the information register for the memory unit. Therefore, after a computation has taken place and the result is stored in the distribution register for storage in the memory unit, the digital computer must wait until the result is stored in the memory unit before doing any other computing operations using the distribution register. Also, the timing in the digital computer for sequencing the operation of its computing circuits also sequences the operation of the memory unit. Thus the computer must wait until the memory operation is complete before proceeding with other computing operations.

A further disadvantage of the above-mentioned prior art digital computer is that separate control circuitry is generally required for doing each of the following functions: starting the memory unit operation, interlocking the operation of the memory unit and the other digital computer circuits; applying control signals to the memory unit designating whether a read or write operation is to take place; and routing the addresses and signals read from memory or to be written in memory to the proper registers. Also, separate transfer circuits are generally required for transferring signals between the distribution register and the other registers in the computer.

An additional disadvantage of the above-mentioned prior art digital computer is that a program step is required for specifying that signals are to be read out of the memory unit and stored in the distribution register and a separate program step is required for specifying that the signals stored in the distribution register are to be transferred into another register of the digital computer. Similarly, two program steps are generally required for writing signals, one for transferring signals from a particular register to the distribution register and another program step to write the signals stored in the distribution register.

These and other disadvantages of the prior art are overcome in a specific embodiment of the present invention in which signals are transferred directly between any one of the information registers of the digital computer and the memory unit. Another advantage of the specific embodiment of a digital computer embodying the present invention is that the address contained in one of a plurality of address registers may be used for addressing the memory unit for reading and writing with any one of the information registers. Additionally, a digital computer embodying the present invention may be arranged whereby the processor is free to perform other computing operations shortly after a memory access is initiated, thereby reducing the time the computer is tied to the memory during a memory access. Further, the addresses and information signals do not have to be transferred through a single register thereby eliminating the time required for this operation. Another advantage is that a single state of a control register is used to initiate a memory operation to specify whether reading or writing is to take place in the memory unit and determines the proper information and address registers for use with the memory unit. By using a single state of the control register for specifying each of these functions, duplicate control logic may be eliminated. Additionally, a single command is used for specifying what operation is to take place in the digital computer and signals read out of the memory unit are automatically transferred directly to the proper information register eliminating the need for the extra command used by the above-mentioned prior art digital computer for this purpose. Also transfer circuits between registers may be eliminated due to the direct transfer between memory unit and the proper information register, and the provision of means for using any one of the address registers with an information register.

Briefly, a specific embodiment of the present invention comprises a programmable digital computer, the register subsystem and associated control for communicating with a memory subsystem comprising a plurality each of address registers for storing addresses designating memory locations in an associated memory and information registers for storing words of information for processing; means for providing a series of program signals defining computing operations to be performed; sequencing and control means responsive to the program signals for providing signals designating one of the information registers and any one of the address registers for use with the designated information register for communicating with such associated memory in accordance with the defined computing operations; and means for applying the address contained in any one of the address registers designated by the control means to such associated memory for writing therein and for applying the address and the word contained in any one of the address and information registers designated by the control means to such associated memory for writing therein.

These and other aspects of the present invention may be more fully understood with reference to the following description of the figures.

In the drawings:

FIG. 5 is a table illustrating the operation of the memory unit shown in FIG. 1 corresponding to each state of the E register shown in the digital computer system of FIG. 1;

FIG. 6 is a flow diagram illustrating the sequence of operation of the digital computer system of FIG. 1 for an exchange operator syllable;

FIG. 6A shows the structure of an exchange syllable;

FIG. 7 is a flow diagram illustrating the sequence of operation of the digital computer system of FIG. 1 for a transfer words operator syllable;

FIG. 7A shows the structure of transfer words syllable;

GENERAL DESCRIPTION

Figure 1:
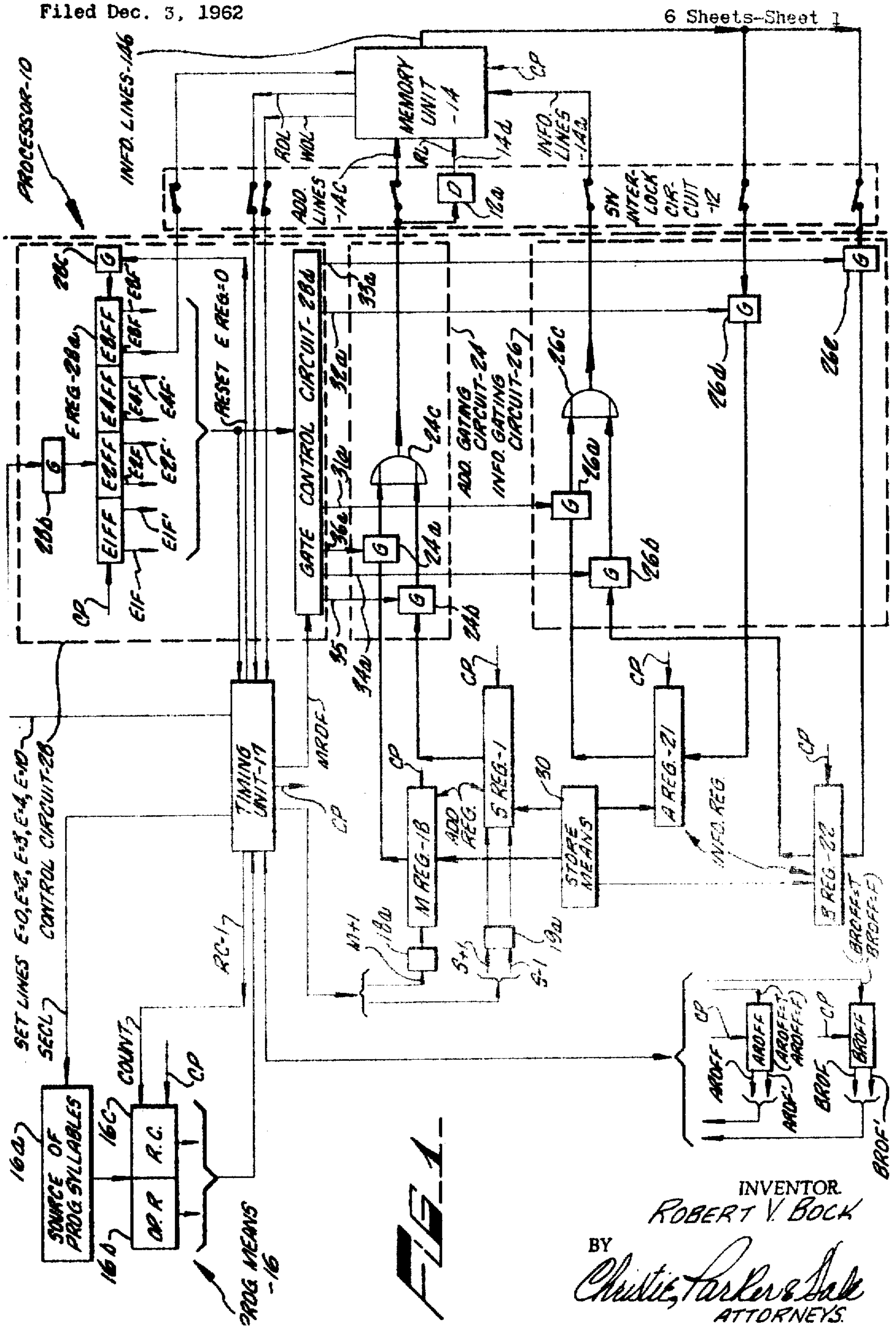
FIG. 1 is a block diagram of a digital computer system and embodying the present invention.

Refer now to FIG. 1 wherein a block diagram is shown of a computer system embodying the present invention. The computer system of FIG. 1 contains a processor 10, a memory unit 14 and a switch interlock circuit 12 for interconnecting the processor 10 and the memory unit 14.

The word processor is used herein in the specification and in the following claims to define the programming circuits, the address registers, the information registers and the associated timing and control circuits which cooperate with the memory unit 14 for performing computing operations on the information contained in the memory unit 14.

Although a single processor 10 and a single memory unit 14 are shown in FIG. 1, a plurality of processors and a plurality of memory units are provided in an actual computing system embodying the present invention. In the actual computing system the switch interlock circuit 12 is arranged for providing the interconnections between the processors and memory units. Details of the switch interlock circuit 12 are described in copending patent application entitled, "Computer System," bearing the Serial No. 89,525, filed on February 15, 1961, and assigned to the same assignee as the present patent application. For the purpose of explaining the present invention, the switch interlock circuit 12 is shown with its switching circuits illustrated by single pole single throw switches arranged in a closed circuit position so that the input and output circuits of the processor 10 and memory unit 14 are connected together. A decoding circuit **12*a* is shown in the switch interlock circuit 12 for applying a control signal at the RL line 14*d* to the memory unit 14 for indicating that a request for access is being made to the memory unit 14**.

Referring in particular to the processor 10, a programming means 16 is provided for providing a series of program syllables to the processor 10. Each program syllable specifies a certain computing operation for the computer system of FIG. 1.

The processor 10 contains a timing unit 17 which is responsive to each program syllable for providing a sequence of timing signals which sequence the operation of the computer system of FIG. 1 and thereby cause the computing operation specified by the program syllable to take place.

M and S address registers 18 and 19 are provided in the processor 10 for storing signals representing addresses of memory locations in the memory unit 14 which are to be addressed in carrying out the computing operations. A and B information registers 21 and 22 are provided in the processor 10, each for storing a word of information signals upon which computing operations are to be performed.

An address gating circuit 24 is provided in the processor 10 for applying the address signals contained in either one of the M and S address registers 18 and 19 to address lines **14*c* which are connected to the address input circuit of the memory unit 14. An information gating circuit 26 is provided in the processor 10 for applying the word of information signals contained in either one of the A and B information registers 21 and 22 to the information lines 14*a* which are connected to the information input circuit of the memory unit 14. The information gating circuit 26 also stores a word of information signals read out of the memory unit 14 into either one of the A and B information registers 21 and 22**.

A control circuit 28 is contained in the processor 10 for initiating the operation of the memory unit 14, and for controlling the gating circuits 24 and 26.

Whenever a memory access is to be made to the memory unit 14, the timing unit 17 provides a timing signal to the control circuit 28. The timing signal may be one of many timing signals formed by the timing unit 17 in response to a particular program syllable for sequencing the computer system of FIG. 1 and causing it to carry out the operation specified by the program syllable. Each timing signal applied to the control circuit by the timing unit 17 specifies whether a read or write operation is to take place in the memory unit 14; designates whether the address contained in the M address register 18 or the S address register 19 is to be used in addressing the memory unit 14; and designates which one of the A and B information registers 21 and 22 is to be used for the transfer of a word of information between the processor 10 and the memory unit 14.

The control circuit 28 contains an E register **28*a*. The E register 28*a* is set into a unique state corresponding to each timing signal provided by the timing unit 17 and thereby provides a stored indication of the reading or writing operation, the particular address register 18 and 19 and the particular information register 21 and 22 designated by the timing signal. The E register 28*a* provides a direct signal to the memory unit 14 specifying a read or write operation in accordance with the state of the E register 28*a***.

The control circuit 28 also contains a gate control circuit **28*d*. The gate control circuit 28*d* provides control signals to the gating circuits 24 and 26 in accordance with the states of the E register 28*a***.

By way of example, assume that the timing unit 17 has formed a timing signal specifying that a word is to be read out of the memory location of the memory unit 14 designated by the address contained in the S address register 19 and that the word read out of the memory unit 14 is to be stored in the A information register 21. FIG. 5 contains a table illustrating the operation of the memory unit 14 for the various states of the E register **28*a*. Referring to FIG. 5 it will be noted that when the E register 28*a* is set into state two the address contained in the S address register 19 will be used for addressing the memory unit 14 and the word contained in that memory location will be read out of the memory unit 14 and stored into the A information register 21. Thus, for the above example, the E register 28*a* is set into state two by the timing signal. The control circuit 28*d* is responsive to state two of the E register 28*a* for causing the address gating circuit 24 to apply the address contained in the S address register 19 to the memory unit 14, and for causing the word of information read out of the memory unit 14 to be stored into the A information register 21 by the information gating circuit 26**.

It should be noted that once the E register **28*a* is set and the address and word of information from the proper registers applied to the memory unit 14 that the memory unit 14 automatically performs a write operation without additional control from the processor 10. Similarly, a read operation is automatically performed by the memory unit 14 independent of the processor 10 once the E register 28*a* is set and the proper address applied to the memory unit 14. The details of the memory unit 14** are described in the following section entitled, "Detailed Description."

It should be noted that information is transferred between the A and B information registers and the memory unit 14 in words. However, the transfer may take place serial by character and parallel by bit where a word comprises a plurality of characters. The basic principle disclosed herein is also applicable to a serial machine wherein information is transferred between the memory unit and the information registers in series.

DETAILED DESCRIPTION

Figure 2:
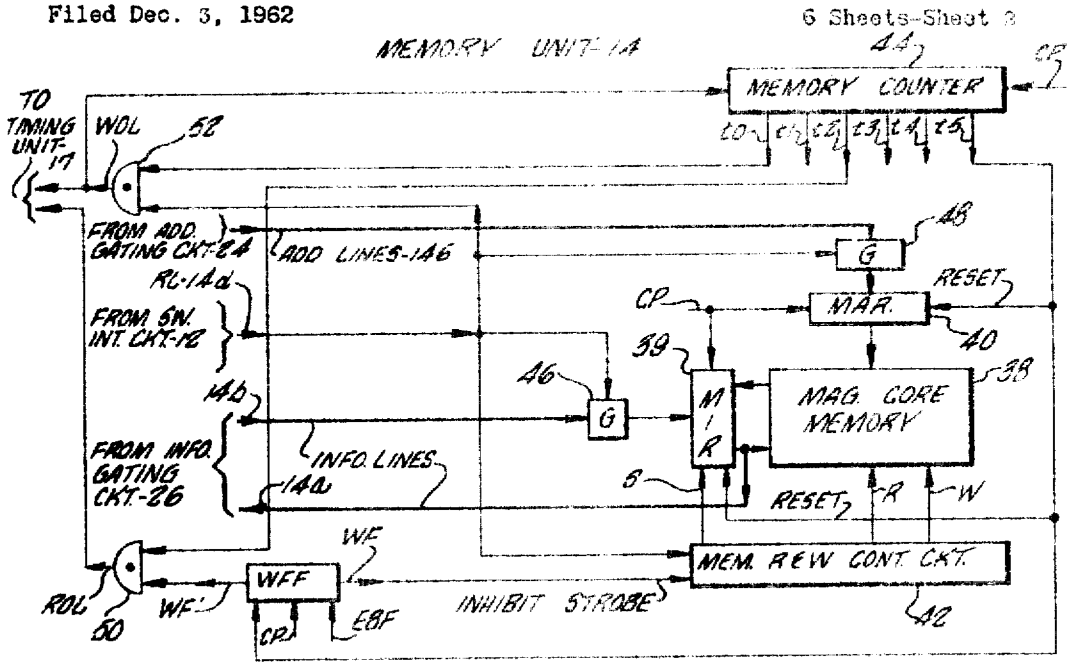
FIG. 2 is a block diagram of the memory unit shown in the digital computer system of FIG. 1.

With the general description of the computer system shown in FIG. 1 in mind refer now to the details of the computer system. The computer system of FIG. 2 is synchronized to clock pulses. Thus all flip-flops, registers, counters, with the exception of certain circuits in the memory unit 14, change states in coincidence with clock pulses. The timing circuit 17 has a CP output circuit at which the synchronizing clock pulses are applied.

*Programming means 16*

The programming means 16 includes a source of program syllables 16*a*, an operator register 16*b* and a repeat counter 16*c*.

Each program syllable is broken down into two parts. One part of each syllable is referred to as an operator which specifies the particular computing operation to be performed by the computing system of FIG. 1. The other half of each program syllable specifies the number of times the particular operation is to be repeated.

For purposes of illustration, two types of program syllables will be explained herein. One program syllable is referred to as an exchange sylable and the other is referred to as a transfer words syllable.

FIG. 6A shows the structure of an exchange syllable. As illustrated in FIG. 6A, the operator portion specifies that it is an exchange syllable. However, in the exchange syllable, the repeat field portion is not used. During certain operations of the computer system of FIG. 1, the M and S address registers 18 and 19 are counted up and down in between memory accesses in order to address the various addresses in the memory unit 14. An exchange operator specifies that the A and B information registers 21 and 22 are to be loaded with the contents of two memory locations of the memory unit 14 addressed by two consecutive addresses contained in the S address register 19.

A transfer words syllable contains an operator portion specifying that words are to be transferred from the memory locations specified by the sequence of addresses contained in the M address register 18 into the memory locations specified by the sequence of addresses contained in the S address register 19. The repeat field portion of the transfer words syllable specifies the number of words to be transferred. Referring back to FIG. 1, the operator register 16*b* is a conventional flip-flop register for storing the operator portion of the program syllables.

The repeat counter 16*c* is a conventional flip-flop register which is set into a particular state corresponding to the repeat field portion of the program syllable provided by the source of program syllables 16*a*. The repeat counter 16*c* is arranged with gating circuits in a conventional counting arrangement whereby the state thereof is decreased one in response to each clock pulse applied thereto from the timing unit 17 in coincidence with a control signal applied at the RC–1 output circuit of the timing unit 17.

Although the source of program signals 16*a* is shown as a separate unit, it should be noted that in the actual digital computer model of the invention, the unit 16*a* actually contains a register, similar to the information registers and the information gating circuits are arranged for storing the information read out of the memory unit 14 including program words containing program syllables into all registers including the program registers.

*Registers 18, 19, 20 and 21*

The M register 18 is a conventional flip-flop register in which an address consisting of a plurality of binary coded bits are stored. The stored address designates a memory location in the memory unit 14.

The M register 18 has a count control circuit 18*a* associated therewith which has a control circuit connected to the M+1 output circuit of the timing unit 17. The count control circuit 18*a* is a conventional gating circuit for causing the flip-flop circuits of the M register 18 to count the address contained therein up one in response to each clock pulse applied in coincidence with a control signal at the M+1 output circuit of the timing unit 17.

The S register 19 is identical to the M register 18. However, the S register 19 also has associated therewith a count control circuit 19*a* which has input circuits connected to the S+1 and S–1 output circuits of the timing unit 17. The count control circuit 19*a* is responsive to a control signal at the S+1 output circuit of the timing unit 17 for causing the S register 19 to count up the address contained therein up one address in response to each clock pulse in the same direction as the M register 18 is counted. However, the count control circuit 19*a* is additionally arranged for counting the address contained in the S register 19 down one address at each clock pulse applied in coincidence with a control signal applied at the S–1 output circuit of the timing unit 17.

The A register 21 is a conventional flip-flop register arranged for storing a word of information. The B register 22 is identical to the A register 21.

Two occupancy flip-flops AROFF and BROFF are shown in FIG. 1 and are associated with the A and B information registers 21 and 22.

The timing unit 17 sets the AROFF flip-flops into a true state whenever a word of information is contained in the A information register 21. Similarly, the timing unit 17 resets the AROFF flip-flop into a false state whenever a word of information is or is not stored in the B information register 22. The circuits of the timing unit 17 for setting the AROFF and BROFF flip-flops into a state for indicating that the corresponding registers do not contain words of information are not shown herein. However, the details of these circuits are shown and described in a copending patent application entitled, "Improvement in a Digital Computer," bearing a Serial No. 202,509, and filed June 14, 1962. For purposes of explaining the present invention, it is assumed that the circuits described in the above referenced copending application entitled, "Improvement in a Digital Computer," have already set the occupancy flip-flops AROFF and BROFF into the correct states prior to the time a program syllable is executed by the computer circuits described herein.

A store means 30 is provided in the computer circuit of FIG. 1 for storing initial addresses in the M and S address registers 18 and 19. The store means 30 is shown in FIG. 1 in order to illustrate that in an actual computing machine information is initially stored in the registers 18 and 19.

*Information gating circuit 24*

The address gating circuit 24 contains conventional gating circuits 24*a* and 24*b* for gating the output circuits of the S and M address registers 19 and 18 respectively through an OR-type of gating circuit 24*c* to the address lines 14*c* to the input of the memory unit 14.

The gating circuit 24*a* has its input circuits connected to one side of each of the flip-flop circuits in the M register 18. A control signal applied at a 36*a* output circuit of the gate control circuit 28*d* causes the gating circuit 24*a* to gate the single-sided outputs from the M address register 18 through the OR gating circuit 24*c* to the address lines 14*c*.

The gating circuit 24*b* is identical to the gating circuit 24*a*, however, the input circuit thereof is connected to a single side of each of the flip-flop circuits of the S register 19. A control signal applied at a 35*a* output circuit of the gate control circuit 28*d* causes the gating circuit 24*a* to gate the single-sided outputs from the S address register 19 through the OR gating circuit 24*c* to the address lines 14*c*.

*Information gating circuit 26*

The information gating circuit 26 contains gating circuits 26*a* and 26*b* connected through an OR type gating circuit 26*c* to the information lines 14*a* to the input circuit of the memory unit 14. The gating circuits 26*a*, 26*b* and 26*c* are similar to the gating circuits 24*a*, 24*b* and 24*c* and are arranged for applying the signals contained in the A and B information registers 21 and 22 to the information lines 14*a*.

The information gating circuit 26 also contains gating circuits 26*d* and 26*e* for storing the words of information read out of the memory unit and applied to the information lines 14*b* into the A and B information registers 21 and 22, respectively. The gating circuits 26*d*, 26*e* store the words of information read out of the memory unit 14 into the A and B information registers 21 and 22, respectively, in response to control signals applied at 32*a* and 33*a* output circuits of the gate control circuit 28*d*.

*Control circuit 28*

The E register 28*a* contains four flip-flop circuits referenced by the symbols E1FF, E2FF, E4FF and E8FF. The numerals in each of the flip-flop reference symbols are coded in the 8421 Binary Coded Number System. Thus, when the E2FF flip-flop is in a true state the E register 28*a* is said to be in state two; when the E8FF and the E2FF are in a true state the E register 28*a* is said to be in state ten.

A gating circuit 28*b* is provided for setting the E register 28*a* into its various states of operation. The gating circuit 28*b* has five input circuits referenced by the symbols E=0, E=2, E=3, E=4, and E=10. The E register 28*a* is set into states 0, 2, 3, 4, and 10 in response to a clock pulse concurrently with a control signal at the input circuits E=0, E=2, E=3, E=4, and E=10.

The output circuits of each of the flip-flop circuits of the E register 28 are represented by the same symbols as the flip-flop circuit except that one of the F's is deleted from the representation and a prime is affixed to the symbol representing the output circuit which receives a control signal when the corresponding flip-flop is in a false state.

A gating circuit 28*c* is provided for resetting the E register 28*a* into a zero state whenever a control signal is applied at the reset E reg.=0 output circuit of the timing unit 17.

Figure 3:
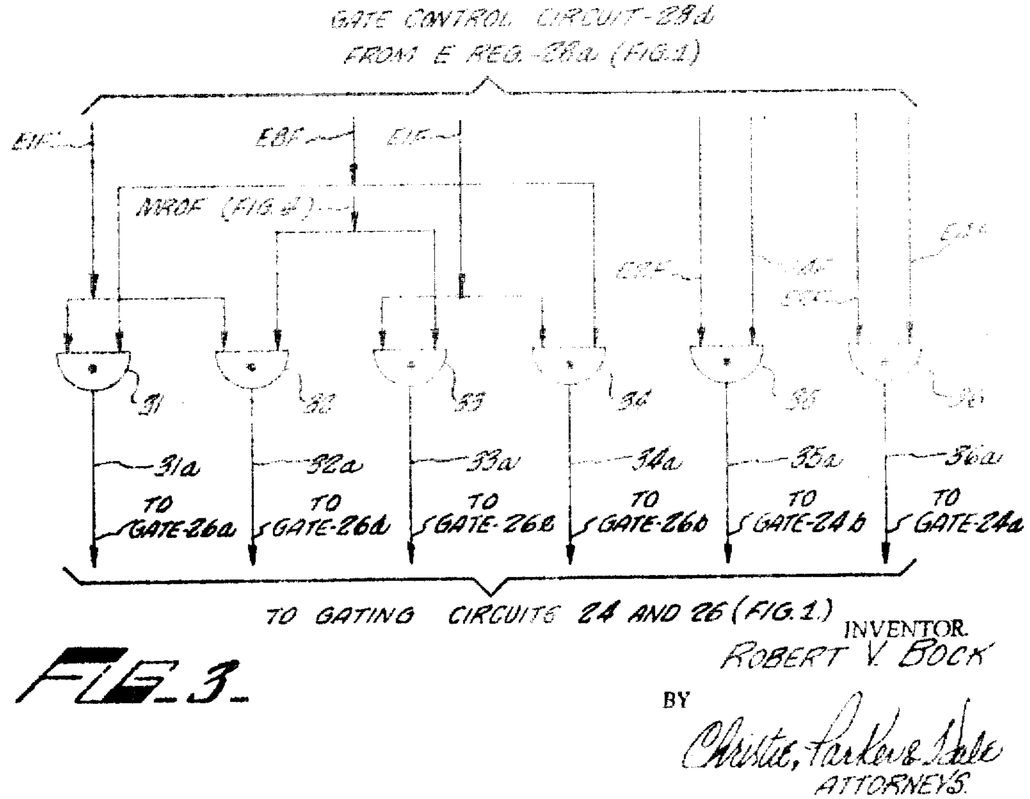
FIG. 3 is a block diagram of the gate control circuit shown in the digital computer system of FIG. 1.

Refer now to the details of the gate control circuit 28*d* shown in FIG. 3. The 31*a* to 36*a* output circuits are connected to AND gating circuits 31 through 36.

Figure 4:
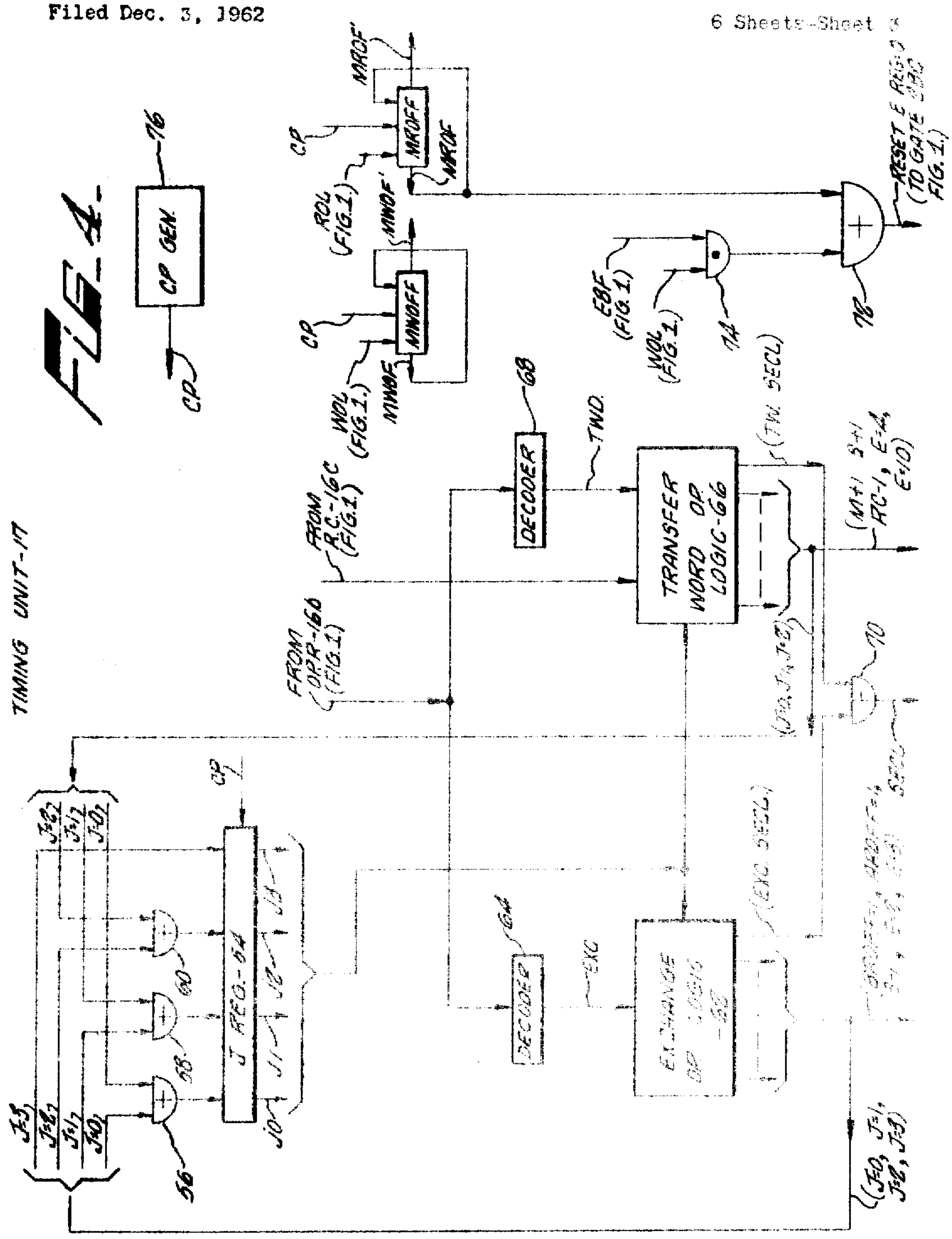
FIG. 4 is a block diagram of the timing unit shown in the digital computer system of FIG. 1.

The gating circuit 31 has its input circuits connected to the output circuits 31F′ and E8F (see E register 28*a* FIG. 1). The gating circuit 32 has its input circuits connected to the output circuits E1F′ (FIG. 1) and the output circuit MROF of a flip-flop circuit MROFF (see FIG. 4). The gating circuit 33 has its input circuits connected to the output circuits E1F (FIG. 1) and MROF (FIG. 4). The gating circuit 34 has its input circuits connected to the output circuits E1F and E8F (FIG. 1). The gating circuit 35 has its input circuits connected to the output circuits E2F and E4F′ (FIG. 1). The gating circuit 36 has its input circuits connected to the output circuits E2F′ and E4F (FIG. 1).

*Memory unit 14*

Refer now to the details of the memory unit 14 shown in FIG. 2. The memory unit 14 has a conventional coincident current type of magnetic core memory unit 38 containing conventional reading and writing circuitry. See chapter 7 of the book entitled, "Digital Computer Fundamentals," by Thomas C. Bartee, printed by McGraw-Hill Book Company, Inc., in 1960 for a good discussion of similar memory arrangements.

Also included is a memory information register 39 for storing words to be written in the magnetic core memory unit 38 and for storing words read out of the magnetic core memory unit 38. A memory address register 40 is provided for storing addresses for selecting the memory locations in the magnetic core memory unit 38 in which words are to be read and written. A memory read and write control circuit 42 is provided for providing read and write control signals to the magnetic core memory unit 38 and for applying strobe signals to the memory information register 39 for causing it to store the words read out of the magnetic core memory unit 38.

The memory information register 39 and the memory address register 40 are conventional flip-flop registers.

Figure 8:
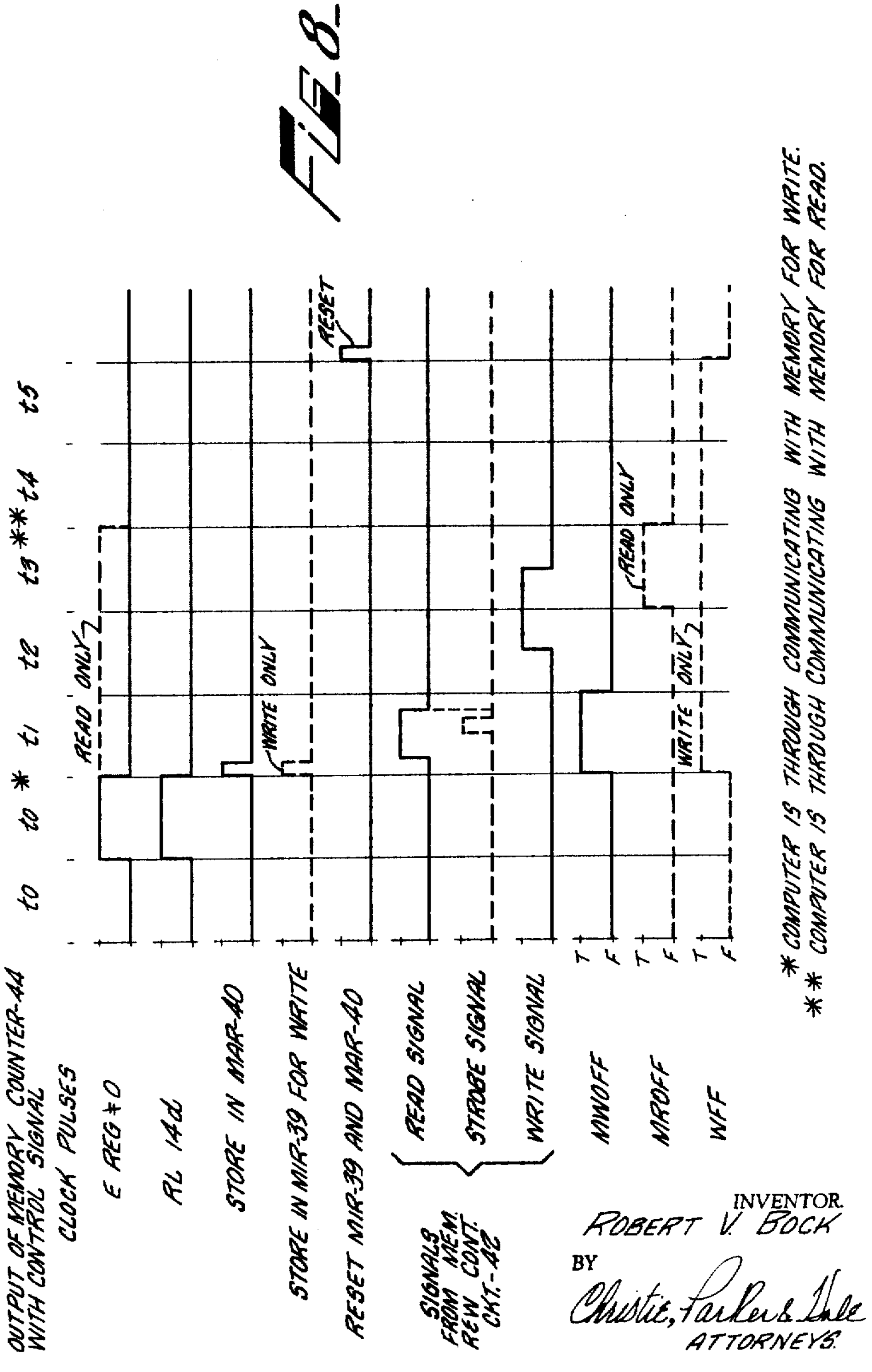
FIG. 8 is a timing diagram illustrating the sequence of operation of the memory unit shown in the computer system of FIG. 1.

The memory read and write control circuit 42 is a conventional timing circuit which is responsive to a control signal applied on the RL line 14*b* by the switch interlock circuit 12 for applying a read control signal followed by a write control signal to the magnetic core memory unit 38 as illustrated in the timing diagram of FIG. 8. The memory read and write control circuit 42 receives inhibit strobe signals from a flip-flop referenced by the symbol WFF. In the absence of an inhibit strobe signal, a read operation is to take place and the memory read and write control circuit 42 applies a strobe control signal to the memory information register 39 in coincidence with a read control signal as illustrated in FIG. 8. The memory information register 39 contains a gating circuit (not shown) which is responsive to the strobe signal for storing a word of information signals read out of the magnetic core memory unit 38 in response to the read signal. When an inhibit strobe signal is applied to the memory read and write control circuit 42, a write operation is to take place in the magnetic core memory unit 38 and a strobe signal is not applied to the memory information register 39.

A memory counter 44 is provided in the memory unit 14 having six states of operation and corresponding to the six states of operation, six output circuits referenced by the symbols *t*0 through *t*5. The memory counter 44 is a conventional counting circuit which is normally locked into state zero. The memory counter 44 is responsive to a control signal applied by a gating circuit 52 in coincidence with a clock pulse for counting into state one. The following five clock pulses cause the memory counter 44 to count from state one through state five and back to state zero counting one state at a time in coincidence with each clock pulse. After the memory counter 44 is back in state zero, it remains there until another control signal is applied to the memory counter 44 by the gating circuit 52. The memory counter 44 is arranged for applying a control signal at an output circuit during a corresponding state of the counter 44.

A gating circuit 46 is provided for storing the information signals applied to the information lines 14*b* into the memory information register 39 in coincidence with a clock pulse whenever a control signal is applied at the request level line 14*d*. A gating circuit 48 stores the address signals applied to the address lines 14*c* into the memory address register 40 whenever a control signal is applied on the RL line 14*d* in coincidence with a clock pulse.

The memory address register 40 and the memory information register 39 have reset circuits connected to the *t*5 output circuit of the memory counter 44. The memory address register 40 and memory information register 39 are reset thereby clearing any information stored therein out, whenever a control signal is applied at the *t*5 output circuit of the memory counter 44 in coincidence with a clock pulse.

The gating circuit 52 is an AND type gating circuit having input circuits connected to the *t*0 output circuit of the memory counter 44 and the RL line 14*d*. The output circuit of the gating circuit 52 is referenced by the symbol WOL.

An AND type gating circuit 50 is provided for applying control signals at an ROL output circuit thereof. The gating circuit 50 has its input circuits connected to the *t*2 output circuit of the memory counter 44 and the WF′ output circuit of the WFF flip-flop.

The WFF flip-flop applies a control signal at the WF′ output circuit and to the WF output circuit whenever the flip-flop is in false and true states, respectively. The WFF flip-flop has its control circuit for setting it into a false state connected to the *t*5 output circuit of the memory counter 44. The WFF flip-flop has its control circuit for setting it into a true state connected to the E8F output circuit (FIG. 1).

*Timing unit 17*

Refer now to the details of the timing unit 17 shown in FIG. 4. The timing unit 17 contains a J register 54. The J register 54 is provided for sequencing the operation of the timing unit 17. The J register 54 has four states of operation and corresponding to the four states of operation output circuits referenced by the symbols *j*0 through *j*3. When the J register 54 is in states zero, one, two and three, control signals are applied at the *j*0, *j*1, *j*2, and *j*3 output circuits, respectively. The J register 54 is set into states zero, one, two, and three in response to control signals applied at input circuits connected to OR gating circuits 56, 58, and 60 and the J=3 output circuit of exchange operator logic circuit 62, respectively.

The gating circuit 56 has its input circuits connected to the J=0 output circuits of the exchange operator logic 62 and a transfer word operator logic circuit 66. The gating circuit 58 has its input circuits connected to the J=1 output circuits of the exchange operator logic circuit 62 and the transfer word operator logic circuit 66. The gating circuit 60 has its input circuits connected to the J=2 output circuit of the exchange operator logic circuit 62 and the transfer word operator logic circuit 66.

The exchange operator logic circuit 62 has its input circuit connected to the output circuit of a decoder circuit 64. The decoder circuit 64 is a conventional decoding circuit for providing a control signal to the exchange operator logic circuit 62 whenever an exchange operator is stored in the operator register **16*b* (FIG. 1). The exchange operator logic circuit 62** contains gating circuits for applying control signals at the output circuits referenced by the symbols shown in brackets in FIG. 4.

The transfer word operator logic circuit 66 has its input circuits connected to the output circuits of a decoding circuit 68 and the repeat counter **16*c* (FIG. 1). The decoding circuit 68 is a conventional decoding circuit for applying a control signal at its output circuit whenever a transfer word operator is stored in the operator register 16*b* (FIG. 1). The transfer words operator logic circuit 66** has a plurality of output circuits referenced by the symbols shown in brackets in FIG. 4.

The exchange operator logic circuit 62 and the transfer words operator logic circuit 66 have output circuits referenced by the symbols EXC SECL and TW SECL where are connected to the input circuit of an OR gating circuit 70. The OR gating circuit 70 has a single output circuit referenced by the symbol SECL.

Also contained in the timing unit 17 are two timing flip-flops MWOFF and MROFF. The MWOFF flip-flop has its input circuit for setting it into a true state whereby a control signal is applied at the MWOF output circuit thereof connected to the WOL output circuit (FIG. 1). The input circuit of the MWOF flip-flop for resetting it into a false state is connected to the MWOF output circuit. The MROFF flip-flop has its input circuit for setting it into a true state whereby a control signal is applied at an MROF output circuit thereof connected to the ROL output circuit (FIG. 1). The input circuit of the MROFF flip-flop for resetting it into a false state whereby a control signal is applied at the MROF′ output circuit is connected to the MROF output circuit.

An OR gating circuit 72 and an AND gating circuit 74 are also included in the timing unit 17. The OR gating circuit 72 has its input circuits connected to the output circuit of the AND gating circuit 74 and to the MROF output circuit of the MROFF flip-flop. The AND gating circuit 74 has its input circuits connected to the output circuits WOL and E8F (FIG. 1). The output circuit of the OR gating circuit 72 is referenced by the symbol E reg.=0.

A clock pulse generator 76 for applying clock pulses to the various circuits of the computer system of FIG. 1 is shown in FIG. 4.

*Exchange operator logic 62*

Figures 4A, 4B:
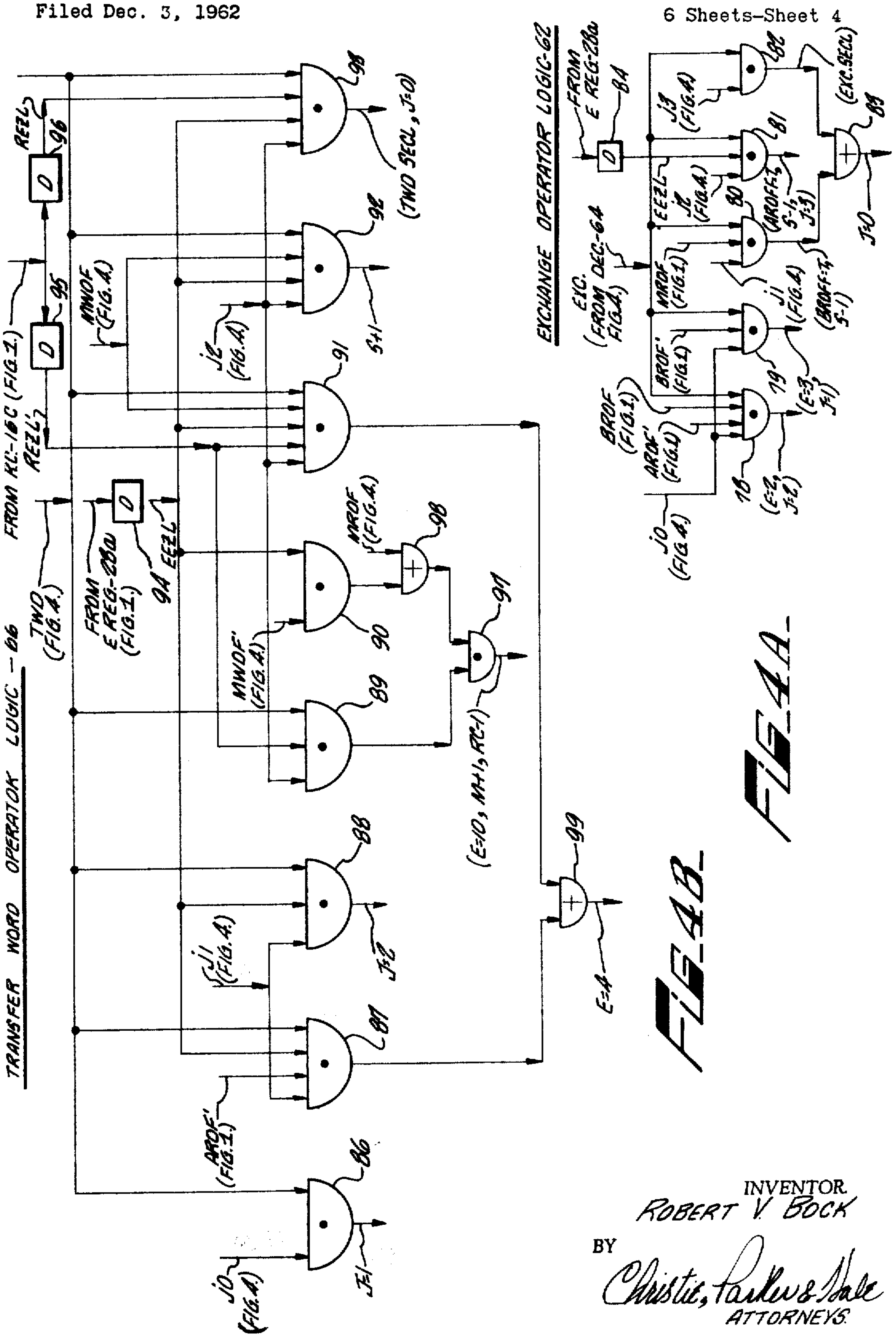
FIG. 4A is a circuit diagram of the exchange operator logic circuit shown in the timing unit of FIG. 4.
FIG. 4B is a circuit diagram of the transfer words operator logic circuit shown in the timing unit of FIG. 4.

Refer now to the details of the exchange operator logic 62 as shown in FIG. 4A. The exchange operator logic 62 contains AND gating circuits 78, 79, 80, 81, and 82, each of which have one input circuit connected to the EXC output circuit (FIG. 4). The AND gating circuit 78 also has input circuits connected to the output circuits *j*0 (FIG. 4), AROF′ (FIG. 1), and BROF (FIG. 1). The gating circuit 79 also has input circuits connected to the output circuits *j*0 (FIG. 4) and BROF′ (FIG. 1). The gating circuit 80 also has input circuits connected to the output circuits *j*1 (FIG. 4) and MROF (FIG. 1). The gating circuit 81 also has input circuits connected to the output circuit *j*2 (FIG. 4) and the output circuit of a decoding circuit 84.

The decoding circuit 84 is a conventional decoding circuit for applying a control signal at an EEZL output circuit connected to the gating circuit 81 whenever the E register **28*a*** is in state zero.

The gate 82 also has an input circuit connected to the output circuit *j*3 (FIG. 4).

The output circuits of the AND gating circuits 80 and 82 are connected to input circuits of an OR gating circuit 83. The OR gating circuit 83 is referenced by the symbol J=0.

The gating circuits 78 through 83 have output circuits referenced by symbols which also appear as output circuits of the exchange operator logic circuit 62 shown in FIG. 4.

*Transfer words operator logic 66*

Refer now to the details of the transfer words operator logic circuit 66 shown in FIG. 4B. The transfer word operator logic circuit 66 contains AND gating circuits 86 through 93, each of which are connected to the TWD output circuit (FIG. 4) except for the gating circuit 90.

The AND gating circuit 86 also has an input circuit connected to the output circuit *j*0.

The gating circuit 87 also has input circuits connected to the output circuits *j*1 (FIG. 4), AROF′ (FIG. 1) and TWD (FIG. 4). The gating circuit 87 additionally has an input circuit connected to the output circuit of a decoding circuit 94.

The decoding circuit 94 is a conventional decoding circuit for applying a control signal at its output circuit referenced by the symbol EEZL whenever the E register **28*a*** is in state zero.

The gating circuit 88 also has input circuits connected to the output circuits *j*1 (FIG. 4) and EEZL. The gating circuit 89 also has input circuits connected to the output circuit *j*2 (FIG. 4) and to the REZL′ output circuit of a decoding circuit 95.

A decoding circuit 95 is a conventional decoding circuit for applying a control signal at the REZL′ output circuit thereof whenever the repeat counter **16*c*** is in any other state than zero.

The gating circuit 90 also has input circuits connected to the output circuits MWOF′ (FIG. 4) and EEZL.

An OR gating circuit 98 is provided in the transfer word operator logic circuit 66. The gating circuit 98 has input circuits connected to the output circuit of the gating circuit 90 and the output circuit MROF (FIG. 4). An AND gating circuit 97 is also provided having input circuits connected to the output circuits of the gating circuits 89 and 98.

The AND gating circuit 91 also has input circuits connected to the output circuits *j*2 (FIG. 4), REZL', EEZL and MWOF (FIG. 4). The gating circuit 92 also has input circuits connected to the output circuits *j*2 (FIG. 4), EEZL and MWOF (FIG. 4). The gating circuit 93 also has input circuits connected to the output circuits *j*2 (FIG. 4) and EEZL and connected to the REZL output circuit of a decoding circuit 96.

A decoding circuit 96 is a conventional decoding circuit for providing a control signal at the REZL output circuit whenever the repeat counter 16*c* is in state zero.

An AND gating circuit 99 is provided in the transfer word operator logic 66. The gating circuit 99 has its input circuits connected to the output circuits of the gating circuits 87 and 91.

The output circuits of the gating circuits 86, 88, 91, 92, 93, 97 and 99 are the output circuits shown for the transfer word operator logic circuit shown in FIG. 4 and have the same reference symbols.

*Operation of memory unit 14*

Refer now to the sequence of operation of the memory unit 14. The timing diagram of FIG. 8 illustrates the sequence of operation of the memory address registers 39 and 40, the memory read and write control circuit 42, the E register 28*a* and the timing flip-flops MWOFF, MROFF and WFF in response to a control signal on the RL line 14*b*. Certain operations illustrated in FIG. 8 only occur during either one or the other of either a write or a read operation and others occur during both a read and a write operation. Those operations which only occur during either a read or a write operation are shown by dash lines in FIG. 8.

Refer now to FIGS. 1, 2, and 8 and assume that a read operation is to take place in the memory unit 14. Assume initially that the WFF, MROFF and MWOFF flip-flop are reset into a false state by conventional circuit means not shown herein. Also assume that the memory information register 39 and the memory address register 40 have been cleared and that the memory counter 44 is in state zero.

The memory access is initiated by address signals applied to the address lines 14*c* (FIG. 1) which causes a control signal to be applied on the RL line 14*d* by the decoder 12*a*. To be explained in the following discussion, address signals are applied on the address lines 14*c* whenever the E register 28*a* is set into a state other than zero. At the first clock pulse past the time when the control signal is applied on the RL line 14*d*, the memory counter 44 is set into state one. The gate 48 stores the address signals applied on the address lines 14*c* into the memory address register 40 and the control signal at the WOL output circuit causes the MWOFF flip-flop (FIG. 4) to be set into a true state.

During state one of the memory counter 44, the memory read and write control circuit 42 applies a read signal to the magnetic core memory unit 38 causing the word of information stored in the memory location addressed by the memory address register 40 to be read out and applied to the input of the memory information register 39. In coincidence with the read signal, the memory read and write control circuit 42 applies a strobe signal to the memory information register 39 causing the word of information read out of the magnetic core memory unit 38 to be stored in the memory information register 39.

At the following clock pulse, during state two of the memory counter 44, the MWOFF flip-flop receives a control signal at the reset input circuit thereof from the MWOF output circuit causing the MWOFF flip-flop to be reset into a false state.

It should be noted that during a read operation the E register 28*b* remains in the state into which it is set and is not reset into a zero state at the end of state zero of the memory counter 44 in contrast to the operation of the E register 28*b* when a write operation is to take place (see the timing diagram of FIG. 8).

During state two of the memory counter 44, the memory read and write control circuit 42 applies a write signal to the magnetic core unit 38. The write signal to the magnetic core unit 38 causes the word of information read out and stored in the memory information register 39 to be restored in the magnetic core memory unit 38 thereby restoring the word of information in the memory location from which it was read and provide a permanent storage for the information.

Also during state two of the memory counter 44 the WFF flip-flop is still in a false state. Therefore, the gate 50 applies a control signal at the ROL output circuit. At the following clock pulse signal during state two of the memory counter 44, the MROFF flip-flop (FIG. 4) is set into a true state due to the control signal at the ROL output circuit, and the memory counter 44 counts into state three.

During state three of the memory counter 44, the memory read and write control circuit 42 continues applying its write signal to the magnetic core memory unit 38. Also, the gating circuit 72 (FIG. 4) applies a control signal to the reset E reg.=0 line which is connected to the gate 28*c* (FIG. 1). At the following clock pulse, the gating circuit 28*c* resets the E register 28*a* into state zero, the control signal at the MROF output circuit causes the MROFF flip-flop (FIG. 4) to be reset into a false state, and the memory counter 44 counts into state four.

At the following clock pulse, the memory counter 44 counts into state five. At the following clock pulse, the memory counter 44 applies reset signals to the registers 40 and 39 causing them to be reset or cleared and the memory counter 44 is counted back into state zero. The memory counter 44 remains in state zero until another control signal is applied to the RL line 14*d*.

Assume now that a write operation is to be performed by the memory unit 14. The write operation is initiated similar to a read operation by setting the E register 28*a* into a state other than zero. With the E register 28*a* in a state other than zero, address signals are applied on the address lines 14*c* and a control signal is again applied on the RL line 14*d* by the decoder 12*a* (FIG. 1). Also, since a read operation is to take place, a word of information signals is applied to the information lines 14*b*.

With the memory counter 44 in state zero and a control signal on the RL line 14*d*, the gating circuit 52 (FIG. 2) applies a control signal at the WOL output circuit. To be explained in detail in the following discussion of the exchange operator and transfer words operator operations whenever a write operation is to take place the E8FF flip-flop of the E register 28*a* is true and a control signal is applied to the input circuit of the WFF flip-flop (FIG. 2) setting it into a true state. The control signals at the WOL and E8F output circuits cause the gating circuits 74 and 72 (see FIG. 4) to apply a control signal at the reset E reg.=0 line which is connected to the gating circuit 28*c* (FIG. 1). Thus, at the following clock pulse, the E register 28*a* is reset into a zero state. The address signals applied on the address lines 14*c* are stored in the memory address register 40 by the gating circuit 48, the word signals applied on the information lines 14*b* are stored into the memory information register 39 by the gating circuit 46, the MWOFF flip-flop (FIG. 4) is set into a true state and the WFF flip-flop (FIG. 2) is set into a true state.

As explained hereinabove, the control signal on the RL line 14*d* also causes the memory read and write control circuit 42 to start its operation. During state one of the memory counter 44 a read signal is applied to the magnetic core memory 38 causing a word of information to be read out of the memory location designated by the address contained in the memory address register 40. However, since a control signal is applied to the inhibit strobe line by the WFF flip-flop (FIG. 2), the memory read and write control circuit 42 is inhibited from applying a strobe signal to the memory information register 39 in coincidence with the read signal. Thus, the word of information read out of the magnetic core memory unit 38 is not stored in the memory information register 39 and is destroyed.

At the following clock pulse while the memory counter 44 is still in state one, the memory counter 44 is set into state two and the control signal at the MWOF output circuit of the flip-flop MWOFF (FIG. 4) causes the MWOFF flip-flop to be reset into a false state.

During state two of the memory counter 44 the memory read and write control circuit 42 starts applying a write signal to the magnetic core memory unit 38. The write signal to the magnetic core unit 38 causes the word of information contained in the memory information register 39 to be written into the memory location of the magnetic core memory unit 38 specified by the address contained in the memory address register 40. Also during state two of the memory counter 44 control signals are applied at the *t*2 and WF' output circuits (FIG. 2) causing the gating circuit 50 (FIG. 2) to apply a control signal at the ROL output circuit. At the following clock pulse the control signal at the ROL output circuit causes the MROFF flip-flop (FIG. 4) to be set into a true state whereby a control signal is applied at the MROF output circuit and the memory counter 44 counts into state three.

During state three, the memory read and write control circuit 42 continues applying the write signal to the magnetic core memory unit 38 and continues the writing of the word of information in the memory information register 39.

During the following two clock pulses the memory counter 44 is counted into states four and five. During state five of the memory counter 44, a control signal is applied to the reset input circuits of the memory address register 40 and the memory information register 39 and applied to the WFF flip-flop (FIG. 2). At the following clock pulse, the memory address register 40 and the memory information register 39 are cleared and the WFF flip-flop is reset into a false state.

It should be noted that during a write operation the processor 10 is freed so that it can continue its processing operations without providing control to the memory unit 14 after the memory counter 44 counts into state one and the MWOFF flip-flop is set into a true state. This is quite important in that a number of clock pulses occur during which the actual writing operation which takes place in the magnetic core memory unit 38. By freeing the processor 10 from the task of sequencing the memory unit 14, the processor 10 is able to go about other processing operations eliminating wasted time. Also, once the memory counter counts into state three and the MROFF flip-flop is set into a true state, the read operation of the memory unit 14 is complete and the processor 10 can then proceed and process the word read from the core memory 38.

It should be noted that the *t*1, *t*3 and *t*4 output circuits of the counter 44 are not connected to other circuits in the computer system disclosed herein but are shown merely to indicate the corresponding states of the counter 44.

*Operation for an exchange operator*

In general, an exchange operator specifies that the A and B registers 21 and 22 are to be stored with the contents of two memory locations in the memory unit 14 specified by two successive addresses contained in the S register 19. The exchange operator is quite an important operator syllable for controlling a digital computer containing a stack such as that described in a copending patent application entitled, "Digital Computer," filed in the name of King et al., bearing a Serial No. 84,156 and filed on January 23, 1961. In the stack memory arrangement disclosed in patent application "Digital Computer," the A and B registers 21 and 22 serve as the top two registers of the stack. The exchange operator is used for loading the top two registers of the stack.

In the following discussion, references will be made to FIGS. 1, 3, 4, 4A and 6A. FIG. 6A is a flow diagram showing the output circuits receiving control signals at the left and at the right the operation in response to the control signal for an exchange operator syllable.

Refer now to the operation of the computer system in response to an exchange operator syllable. Assume initially that the E register 28 (FIG. 1) and the J register 54 (FIG. 4) are in state zero and that the AROFF and BROFF flip-flops (FIG. 1) are in a false state. As described hereinabove, whenever the AROFF or BROFF flip-flop are in a false state, the false state indicates that the corresponding A and B registers 21 and 22 respectively are empty and must be loaded. Assume now that an exchange operator is stored in the operator register 16*b* and the repeat counter 16*c* by the source of program syllable 16*a*.

The decoder circuit 64 (FIG. 4) applies a control signal at the EXC output circuit. The gating circuit 79 (FIG. 4A) in turn applies a control signal at the E=3, J=1 output circuit. The gating circuits 58 (FIG. 4) and 28*b* (FIG. 1) receive the control signal from the gating circuit 79 and at the following clock pulse the J register 54 (FIG. 4) is set into state one and the E register 28*a* is set into state three.

Referring to FIG. 5 it will be noted that when the E register 28*a* is in state three, it specifies that a read operation is to take place of the memory unit 14, that the contents of the S register 19 (FIG. 1) are to be used as the address and the word which is read is to be stored in the B register 22 (FIG. 1).

At this point the E register 28*a* is in state three and the J register 54 in state one. As illustrated in FIG. 5, the E4FF and E2FF flip-flops are in false and true states, respectively, while the E register 28*a* is in state three. The gating circuit 35 (FIG. 3) now applies a control signal at the output circuit 35*a*. The control signal at the output circuit 35*a* causes the gating circuit 24*b* (FIG. 1) to gate out the address signals contained in the S register 19 through the OR gating circuit 24*c* to the address lines 14*c* to the memory unit 14 and to the decoder circuit 12*a*. The decoder circuit 12*a* detects that an address is being applied to the memory unit 14 and in turn applies a control signal on the RL line 14*d* to the memory unit 14.

With the E register 28 specifying a read operation is to take place, the control signal on the RL line 14*d* causes the memory unit 14 to perform a read operation using the address contained in the S register 19. The memory unit 14 operation during a read is explained hereinabove in detail.

After the memory unit 14 has completed its read operation, the MROFF flip-flop (FIG. 4) is set into a true state and a control signal applied at the MROF output circuit as described hereinabove. The E register 28*a* is still in state three and a control signal is still applied at the E1F output circuit thereof. Therefore, upon receipt of the control signal at the MROF output circuit, the gating circuit 33 (FIG. 3) applies a control signal at the output circuit 33*a*. As described hereinabove, the signals of the word of information read out of the memory unit 14 are applied to the information lines 14*a* in coincidence with the control signal at the MROF output circuit. The control signal at the output circuit 33*a* causes the gating circuit 26*d* (FIG. 1) to store the word of information applied to the information lines 14*a* into the B information register 22 at the following clock pulse.

At the same clock pulse at which the word of information is stored in the B information register 22, the J register 54 (FIG. 4) is in state one, thus the gating circuit 80 (FIG. 4A) applies a control signal at the BROFF=T, S–1, output circuit thereof. This signal in turn causes a control signal at the J=0 output circuit of the gating circuit 83 (FIG. 4A). The control signal at the BROFF=T, S–1 output circuit is applied to the input circuit of the count control circuit 19*a* (FIG. 1) and to the input circuit of the BROFF flip-flop (FIG. 1) for setting it into a true state. The control circuit at the J=0 output circuit is applied to the input circuit of the gating circuit 56 (FIG. 4). As explained in connection with the memory unit 14 operation, a control signal is also applied on the reset E reg.=0 line to the gating circuit 28*c* (FIG. 1). Thus, at the same clock pulse at which the word is stored in the B information register 22 the count control circuit 19*a* counts the address contained in the S register 19 down one address, the BROFF flip-flop is set into a true state, the J register 54 is reset into state zero and the E register 28*a* is reset into state zero.

At this point the J register 54 and the E register 28*a* are in a state zero, the BROFF flip-flop is in a true state and the AROFF flip-flop in a false state. The gating circuit 78 (FIG. 4A) applies a control signal at the E=2, J=2 output circuit. The control signal at the E=2, J=2 output circuit of the gating circuit 78 is applied to the input circuit of the gating circuits 28*b* (FIG. 1) and 60 (FIG. 4). Thus the following clock pulse sets both the J register 54 and the E register 28*a* into state two.

Referring back to FIG. 5, it will be noted that state two of the E register 28*a* specifies that a read operation is to take place using the address contained in the S register 19 and the word read out of the memory unit 14 is to be stored into the A information register 21.

At this point the BROFF and AROFF flip-flops are in true and false states respectively and both the J register 54 and E register 28*a* are in state two. The gating circuits 35 (FIG. 3) and 24*b* (FIG. 1) cause the address contained in the S register 19 to be applied to the input of the memory unit 14 and the decoder circuit 12*a*.

The memory unit 14 goes through another read cycle exactly as described hereinabove using the new decremented address contained in the S register 19. The word read out of the memory unit 14 and applied to the information lines 14*a* are stored in the A information register 21 by the gating circuit 26*d* under control of the gating circuit 32 similar to the operation of the gating circuits 26*c* and 33 for the B information register 22 described hereinabove. Also, the gating circuit 81 (FIG. 4) causes the AROFF flip-flop to be set to a true state similar to the gating operation for the BROFF flip-flop, the address contained in the S register 19 is counted down one and the J register 54 is set into state three similar to the operations of these same circuits described hereinabove.

With the J register 54 in state three the gating circuits 82 and 83 (FIG. 4A) apply a control signal at the J=0 output circuit. The gating circuit 82 applies a control signal at the output circuit EXC SECL causing the gating circuit 70 (FIG. 4) to apply a control signal at the SECL output circuit. The control signal at the SECL output circuit is in turn applied to the input of the source of program syllables 16*a* (FIG. 1). Thus at the following clock pulse the J register 54 is reset into state zero and the source of program syllables 16*a* stores another program syllable into the operator register 16*b* and the repeat counter 16*c* (FIG. 1) and the operation of the exchange operator is terminated.

Although the operation of an exchange operator has been described assuming that both the A and B information registers 21 and 22 were empty upon receiving the exchange operator syllable, it should be understood that in an actual digital computer model incorporating the present invention, the operation may be such that only one of the information registers 21 and 22 may be empty. In such a case, only the corresponding flip-flop AROFF and BROFF will be in a false state. Although the logical circuit and other gating circuits for such a condition are not shown, it should be understood that the operation and circuitry of the computer system of FIG. 1 for an exchange operator when only one of the information registers 21 and 22 is empty is similar to that wherein both the information registers 21 and 22 are empty. The details of such circuits are not essential to the understanding of the present invention, therefore, are not described or shown herein.

*Operation for a transfer words operator*

A transfer words operator syllable specifies that the number of words designated by the repeat field portion of the syllable are to be transferred from the addresses designated by the contents of the M register 18 to the addresses designated by the contents of the S register 19.

Assume intially that the J register 54 and the E register 28*a* are in state zero and that the AROFF flip-flop is in a false state designating that the A information register 21 is empty. Also assume that a control signal is applied on the SECL control line to the source of program syllables 16*a* (FIG. 1) and that a transfer words operator syllable is stored in the operator register 16*b* and the repeat counter 16*c*. The gating circuit 86 (FIG. 4B) applies a control signal at the J=1 output circuit causing the J register 54 to be set into state one at the following clock pulse.

With the J register 54 in state one, the AROFF flip-flop is still in a false state and the E register 28*a* in state zero. The decoder circuit 94 (FIG. 4B) applies a control signal at the EEZL output circuit and the gating circuit 87 in turn applies a control signal to the gating circuit 99. The gating circuit 99 in turn applies a control signal at the E=4 output circuit thereof which is connected to the input of the gating circuit 28*b* (FIG. 1). Concurrently, the gating circuit 88 applies a control circuit at the J=2 output circuit which is connected to the input circuit of the gating circuit 60 (FIG. 4). At the following clock pulse, the E register 28*a* is set into state four and the J register 54 is set into state two.

Referring now to FIG. 5, it will be noted that state four of the E register 28*a* designates that a read operation is to take place in the memory unit 14 and the address contained in the M register 18 is to be used for the address, and the word read out of the addressed memory location is to be stored in the A information register 21.

With the E register 28*a* in state four, the gating circuit 36 (FIG. 3) applies a control signal to the gating circuit 24*a* (FIG. 1) causing the address signals contained in the M register 18 to be gated through the gating circuit 24*c* to the input circuits of the memory unit 14 and the decoding circuit 12*a*. Similar to that explained hereinabove, the decoding circuit 12*a* in turn applies a control signal on the RL line 14*d* to the memory unit 14 and a read operation is initiated in the memory unit 14.

After the information word is read out of the memory unit 14 and applied to the information lines 14*b* and the control signal is applied at the MROF output circuit, the gating circuit 32 (FIG. 3) applies a control signal at the output circuit 32*a* causing the gating circuit 26*d* (FIG. 1) to store the word of information applied to the information lines 14*b* in the A register 21.

The J register 54 is still in state two, and assume that the E register 28*a* is set into state zero and that the MROFF flip-flop is reset into a false state as described hereinabove. Also assume that the repeat field of the transfer words operator syllable is a number other than zero. The decoding circuit 95 (FIG. 4B) applies a control signal at the REZL′ output circuit. Also the decoding circuit 94 (FIG. 4B) applies a control signal at the EEZL output circuit. The gating circuit 90 (FIG. 4B) in turn applies a control signal to the gating circuit 98 (FIG. 4B) which in turn applies a control signal to the gating circuit 97 (FIG. 4B). Also, the gating circuit 89 (FIG. 4B) applies a control signal to the input of the gating circuit 97 (FIG. 4B). The gating circuit 97 applies a control signal at its output circuit E=10, M+1, RC−1. The control signal at the output circuit of the gating circuit 97 (FIG. 4B) is applied at the input circuit of the gating circuits **28*b* (FIG. 1), the input circuit of the count control circuit 18*a* (FIG. 1) and to the count input circuit of the repeat counter 16*c*. At the following clock pulse the E register 28*a* is set into state ten, the count control circuit 18*a* (FIG. 1) causes the M register 18 to count the address contained therein up one and the state of the repeat counter 16*c*** is counted down by one.

Referring again to FIG. 5, it will be noted that state ten of the E register **28*a* specifies that a write operation is to take place using the address contained in the S register 19 and the word of information previously stored in the A information register 21**.

Control signals are applied at the output circuits E1F', E2F, E4F' and E8F output circuits of the E register **28*a*. This causes the gating circuits 31 and 35 (FIG. 3) to form control signals. The control signals at the output circuits 31*a* and 35*a* cause the gating circuits 26*a* and 24*b* (FIG. 1) to apply the signals contained in the B information register 22 and the S address register 19 through the gating circuits 26*c* and 24*c* to the information lines 14*b* and the address lines 14*c* to the input of the memory unit 14. The decoding circuit 12*a* applies a control signal on the RL line 14*d*. The control signal on the RL line 14*d* and the control signal at the E8F output circuit of the E register 28*a* initiates a write operation in the memory unit 14 automatically as described hereinabove in connection with the memory unit 14**.

Subsequently, the E register **28*a* (FIG. 1) is reset into state zero as described hereinabove and the MWOFF flip-flop (FIG. 4) is set into a true state. The J register 54 (FIG. 4) is still in state two and assuming the repeat counter 16*c* is not counted down to state zero the decoder circuit 95** (FIG. 4B) still applies a control signal at the REZL' output circuit.

These conditions cause the gating circuits 91 and 99 (FIG. 4B) to apply a control signal at the E=4 output circuit and causes the gating circuit 92 (FIG. 4B) to apply a control signal at the S+1 output circuit. At the following clock pulse, the count control circuit **19*a* (FIG. 1) causes the S register 19 to count the address contained therein up one state and the gating circuit 28*b* (FIG. 1) sets the E register 28*a*** into state four.

With the E register **28*a* set into state four, a read operation is again initiated as described above using the new incremented address contained in the M register 18 and the information word read out of the memory unit 14 is again stored in the A information register 21** similar to that described above.

The read operation using the address contained in the M register 18 and the write operation using the address contained in the S register 19 is repeated over and over and the repeat counter **16*c* decreased one state each time until the repeat counter 16*c*** is in state zero thereby indicating the designated number of words have been transferred.

When the repeat counter **16*c* has been reduced to a state zero, the decoder circuit 96 (FIG. 4B) applies a control signal at the REZL output circuit. The gating circuit 93 (FIG. 4B) in turn applies a control signal at the TWD SECL, J=0 output circuit. The control signal at the TWD SECL, J=0 output circuit causes the gating circuit 70 (FIG. 4) to apply a control signal at the SECL output circuit and causes the J register 54 to be reset into state zero. The source of program syllables 16*a* is responsive to the control signal at the SECL output for storing a new program syllable into the operator register 16*b* and the repeat counter 16*c***. In this manner, the operation of a transfer words operator is terminated.

What is claimed is:

1. In a digital computer system, comprising:
(a) addressable memory means;
(b) a plurality of registers for storing addresses;
(c) a plurality of registers for storing words for processing;
(d) means for providing program signals defining computing operations;
(e) sequence and control means responsive to the program signals for providing signals designating one of the word registers and any one of the address registers for use with the designated word register for communicating with the memory means in accordance with the defined computing operations;
(f) means for coupling the content of any one of the address registers designated by the sequence and control means to the memory means for addressing same; and
(g) means for coupling words between the memory means and the word register designated by the sequence and control means for causing the words to be read and written in the memory means.

2. In a digital computer system, comprising:
(a) addressable memory means;
(b) a plurality of registers for storing addresses;
(c) a plurality of registers for storing words for processing;
(d) means for providing program signals defining computing operations;
(e) sequence and control means responsive to the program signals for providing signals designating one of the word registers and any one of the address registers for use with the designated word register for communicating with the memory means in accordance with the defined computing operations;
(f) gating circuit means for coupling the content of any one of the address registers designated by the sequence and control means to the memory means for addressing same; and
(g) gating circuit means for coupling words between the memory means and the word register designated by the sequence and control means for causing the words to be read and written in the memory means.

3. In a digital computer system, comprising:
(a) addressable memory means;
(b) a plurality of registers for storing addresses;
(c) a plurality of registers for storing words for processing;
(d) means for providing program signals defining computing operations;
(e) sequence and control means including a controllable storage means for storing a signal, in response to a program signal, designating one of the word registers and any one of the address registers required in the computing operation for use with the designated word register for communicating with the memory means;
(f) means for coupling the content of any one of the address registers designated by the signal stored in the controllable storage means to the memory means for addressing same; and
(g) means for coupling words between the memory means and the word register designated by the signal stored in the controllable storage means for causing the words to be read and written in the memory means.

4. In a programmable digital computer the memory and associated register subsystem therefor, comprising:
(a) memory means arranged for reading and writing words of information in memory locations thereof designated by applied address signals;
(b) a plurality of address registers for storing addresses designating memory locations;
(c) a plurality of information registers for storing words for processing;

(d) means for providing a series of program signals defining computing operations to be performed;

(e) sequence and control means responsive to the program signals for providing signals designating one of the information registers and any one of the address registers for use with the designated information register for communicating with the memory means in accordance with the defined computing operation; and (f) means for coupling the address contained in the address register designated by the sequence and control means to the memory means for reading a word out thereof including means for coupling the address and the word which are contained in the address and information registers designated by the sequence and control means to the memory means for writing the word therein.

5. In a digital computer system the combination of which comprises:

(a) an addressable memory unit arranged for automatically reading and writing words of information in memory locations thereof designated by applied address signals in response to applied read and write control signals;

(b) a plurality of address registers for storing addresses designating memory locations in the memory means;

(c) a plurality of information registers for storing words for processing;

(d) means for providing a series of program signals defining a series of computing operations;

(e) timing means connected to be responsive to the program signals for forming timing signals designating one of the information registers and any one of the address registers for use with the designated information register in communicating with the memory unit for executing the program signals and additionally arranged for forming signals designating whether reading or writing is to take place in the memory unit;

(f) control means responsive to the timing signals for storing signals corresponding to the registers and the reading and writing operation designated by the timing signals and arranged for providing read and write control signals to the memory means in accordance with the stored signals; and (g) means responsive to the stored content of the control means for coupling the address contained in any one of the address registers designated by the content of the control means to the memory unit for reading in the memory unit when a read control signal is applied to the memory unit and including means for coupling the address and the word contained in any one of the address and information registers designated by the content of the control means to the memory unit for writing therein when a write control signal is applied to the memory unit.

6. In a digital computer system the combination of which comprises:

(a) an addressable memory unit arranged for automatically reading and writing words of information in memory locations thereof designated by applied address signals in response to applied read and write control signals;

(b) a plurality of address registers for storing addresses designating memory locations in the memory unit;

(c) a plurality of information registers for storing words for processing;

(d) programming means for providing a series of program signals defining a series of computer operations;

(e) timing means connected to be responsive to the program signals for forming timing signals designating one of the information registers and any one of the address registers for use with the designated information register in communicating with the memory unit for executing the program signals and additionally arranged for forming signals designating whether reading or writing is to take place in the memory unit;

(f) control means including means for storing signals corresponding to the registers and the reading or writing operation designated by the timing signals and arranged for applying read and write control signals to the memory means in accordance with the stored signals; and (g) gating means responsive to the stored content of the control means for coupling the address contained in any one of the address registers designated by the content of the control means to the memory unit for reading therein when a read control signal is applied to the memory unit and including gating means for coupling the address and the word contained in any one of the address and information registers designated by the content of the control means to the memory unit for writing therein when a write control signal is applied to the memory unit.

7. In a digital computer as defined in claim 6 wherein the control means comprises a storage register which is set into a state corresponding to the particular register and the particular reading and writing operation designated by the timing signals and gating means arranged for providing read and write control signals to the memory means according to the state of the storage register.

8. In a digital computer system as defined in claim 6 wherein the addressable memory unit comprises a memory means for storing words of information, a buffer address register for storing addresses applied to the memory unit for designating memory locations in the memory unit for reading and writing, a buffer information register for storing words read out of and to be written into the memory means, and a memory control circuit for automatically sequencing the reading and writing in the memory means in response to the applied read and write control signals.

9. In a computer system, comprising:

(a) a controllable memory unit including, (1) memory means having memory locations for storing words of information for processing, (2) a buffer address register for storing addresses designating memory locations for reading and writing in the memory means, (3) a buffer information register for storing words read out of and to be written into the memory means, (4) a memory control unit responsive to applied read and write control signals for causing the memory means to read and write words in the memory locations designated by the content of the buffer address register and thereby provide memory control independent of processing apparatus for decreasing computing time required for memory access; and (b) a processing unit, comprising, (1) a plurality of address registers for storing addresses designating memory locations in the memory means, (2) a plurality of information registers for storing words for processing, (3) programming means for providing a series of program signals defining a series of processing operations, (4) timing means connected to be responsive to the program signals for forming timing signals for designating one of the information registers and any one of the address registers for use with the designated information register in communicating with the memory unit for executing the program signals and for designating whether reading or writing is to take place in the memory unit, (5) control means including a storage register which is set into a state corresponding to the particular reading and writing operation designated by the timing signals and including gating means for providing read and write control signals to the memory control unit in accordance with the state of the storage register, (6) a gating circuit for selectively storing the address contained in any one of the address registers designated by the state of the storage register into the address register, and (7) a gating circuit for coupling a word between any one of the information registers designated by the state of the storage register and the buffer information register.

10. In a computer system, comprising:

(a) a controllable memory unit including, (1) memory means having memory locations for storing words of information for processing, (2) a memory address register for storing addresses designating memory locations for reading and writing in the memory means, (3) a buffer information register for storing words read out of and to be written into the memory means, (4) a memory control unit responsive to applied read and write control signals for causing the memory means to read and write words in the memory locations designated by the content of the memory address register and thereby provide memory control independent of processing apparatus for decreasing computing time required for memory accesses; and (b) a processing unit, comprising, (1) a plurality of address registers for storing addresses designating memory locations in the memory means, (2) a plurality of information registers for storing words for processing, (3) programming means for providing a series of program signals defining a series of processing operations, (4) timing means connected to be responsive to the program signals for forming timing signals for designating one of the information registers and any one of the address registers for use with the designated information register in communicating with the memory unit for executing the program signals and for designating whether reading or writing is to take place in the memory unit, (5) control means responsive to the timing signals including a storage means for storing signals corresponding to the registers and the reading and writing operation designated by the timing signals and arranged for providing read and write control signals to the memory control unit in accordance with the stored signals, (6) a gating circuit for selectively storing the address contained in any one of the address registers designated by the signal content of the control means into the memory address register, and (7) a gating circuit for coupling a word between any one of the information registers designated by the signal content of the control means and the buffer information register.

11. In a computer system, comprising:

(a) a controllable memory unit including, (1) a magnetic core storage unit for storing words of information for processing, (2) a memory address register for storing addresses designating memory locations for reading and writing in the core storage unit, (3) a buffer information register for storing words read out of and to be written into the core storage unit, (4) a memory control unit responsive to applied read and write control signals for causing the core memory unit to read and write words in the memory locations designated by the content of the memory address register and thereby provide memory control independent of processing apparatus for decreasing computing time required for memory accesses; and (b) a processing unit, comprising, (1) a plurality of address registers for storing addresses designating memory locations in the core storage unit, (2) a plurality of information registers for storing words of information for processing, (3) programming means for providing a series of program syllables each of which defines a computing operation, (4) timing means responsive to each program syllable for forming at least one single timing pulse designating one of the information registers and any one of the address registers for use with the designated information register in communicating with the memory unit and additionally designating if reading or writing is to take place in the memory unit for executing the program syllables, (5) control means including storing means responsive to the single timing pulse for storing a signal corresponding to the registers and the reading and writing operation which are designated by the timing pulse and arranged for providing read and write control signals to the memory means in accordance with the stored signal, (6) gating means for storing the address contained in any one of the address registers designated by the signal content of the control means into the memory address register, (7) gating means for storing the word contained in any one of the information registers designated by the signal content of the control means into the buffer information register in response to a write signal from the control means, and (8) gating means for storing a word read out of the core memory unit and stored in the buffer information register into any one of the information registers designated by the signal content of the control means in response to a read signal from the control means.

No references cited.

ROBERT C. BAILEY, *Primary Examiner.*

P. J. HENON, Jr., *Assistant Examiner.*

UNITED STATES PATENT OFFICE

CERTIFICATE OF CORRECTION

Patent No. 3,268,874 August 23, 1966

Robert V. Bock

It is hereby certified that error appears in the above numbered patent requiring correction and that the said Letters Patent should read as corrected below.

Column 9, line 61, for "where" read -- which --; column 11, line 20, for "91" read -- 97 --; column 17, line 31, for "14" read -- 14. The write operation takes place in the memory unit 14 --; line 73, before "for" insert -- circuit --; column 20, line 59, for "access" read -- accesses --.

Signed and sealed this 1st day of August 1967.

(SEAL)

Attest:

Edward M. Fletcher, Jr.

Attesting Officer

EDWARD J. BRENNER

Commissioner of Patents